(12) United States Patent
Fraser (10) Patent No.: US 10,812,007 B1
(45) Date of Patent: Oct. 20, 2020

(54) MOTOR UNDERVOLTAGE RIDE-THROUGH CIRCUIT CONTROLLED BY MOTOR PROTECTIVE RELAY

(71) Applicant: Siemens Industry, Inc., Alpharetta, GA (US)

(72) Inventor: Alan W. Fraser, Bellevue, WA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 16/386,079

(22) Filed: Apr. 16, 2019

(51) Int. Cl.
*H02K 17/32* (2006.01)
*H02P 29/024* (2016.01)

(52) U.S. Cl.
CPC .................. *H02P 29/026* (2013.01)

(58) Field of Classification Search
CPC ............ H02H 7/085; H02H 3/06; H02P 1/26
See application file for complete search history.

(56) References Cited

U.S. PATENT DOCUMENTS 3,875,464 A * 4/1975 Gary ........................ H02H 3/06
361/31

5,657,194 A   8/1997 Waltz
5,959,818 A   9/1999 Blakely

OTHER PUBLICATIONS

Dip-Proofing Technologies, Inc. "Installation & Service Manual Voltage-Dip Proofing Inverters" Rev 1.0—Oct. 18, 2005.
Melltronics Industrial, Inc. "Know Trip" http://www.melltronics.com/products.asp?productName=KNOW%20TRIP&page=specsAccessed Mar. 20, 2019.
Solutions, Power Quality. "Coil-Lock™Hold-In Device." Online document—http://www. pqsi. com/Coilock%2012.
PCT Search Report dated Jun. 9, 2020, for PCT Application PCT/US2020/023480, 15 pages.

* cited by examiner

*Primary Examiner* — Karen Masih (57) ABSTRACT

A capacitor and other components are added to the motor starter control circuit in order to supply power to the contactor coil during undervoltage events. In order to avoid adding an additional active device in the control circuit to control the application of capacitor voltage to the contactor coil, a microprocessor-based motor protective relay may be used to switch the capacitor in or out in a controlled manner. The motor protective relay is used for overload protection as well as for undervoltage switching of the capacitor. The motor protective relay is microprocessor-based and offers user-configurable general-purpose logic and math processing functions to control the capacitor switching.

17 Claims, 3 Drawing Sheets

FIG. 3

MOTOR UNDERVOLTAGE RIDE-THROUGH CIRCUIT CONTROLLED BY MOTOR PROTECTIVE RELAY

TECHNICAL FIELD

The present embodiments relate generally to voltage sags in motor control circuits.

BACKGROUND

Voltage sags occasionally occur on electrical power systems. These voltage sags or undervoltages may prevent motor control circuits from keeping contactors feeding the motors in the closed state, causing the motors to unwantedly stop.

For contactor coils that operate on rectified-alternating current (AC) voltage, unwanted stopping of the motor due to a voltage sag may be avoided by: a capacitor-powered uninterruptible power supply (UPS) having an inverter designed to feed inductive loads; a network of discrete components including one or more capacitors, resistors, rectifiers, voltage-sensing relays and timers that are connected in a way that applies voltage to the contactor holding coil(s) during a voltage sag, typically for a specific manufacturer's contactor; feeding the motor control circuit from a large, external UPS; or feeding the motor control circuit from an external direct current (DC) battery system and also replacing AC-rated control relays and other devices with DC-rated components. These solutions may require large devices added externally to a motor starter control circuit.

For AC contactor coils, the unwanted stopping may be avoided by: a device that feeds the AC contactor with a controlled amount of rectified-AC voltage; or timers that re-close the motor contactors if a voltage sag only lasts a short time (e.g., a couple of seconds or less). These solutions may require large devices added externally to a motor starter control circuit.

SUMMARY

A capacitor and other components are added to the motor starter control circuit in order to supply power to the contactor coil during undervoltage events. In order to avoid adding an additional active device in the control circuit to control the application of capacitor voltage to the contactor coil, a microprocessor-based motor protective relay may be used to switch the capacitor in or out in a controlled manner. The motor protective relay is used for overload protection as well as for undervoltage switching of the capacitor. The motor protective relay is microprocessor-based and offers user-configurable general-purpose logic and math processing functions to control the capacitor switching.

In a first aspect, a control system for a medium or low voltage motor is provided. A motor contactor connects to supply power to a motor. A first capacitor is connectable with the motor contactor. A microprocessor-based motor protective relay is configured for overload protection. The microprocessor-based motor protective relay is also configured to detect a voltage sag of power to the motor and to switch in the first capacitor to apply voltage to the motor contactor in response to the detection of the voltage sag.

In a second aspect, an electric motor control system is provided. An electric motor is connected to receive power. A motor control power circuit has a motor contactor connected to supply power to the electric motor and has a first capacitor connected with the motor contactor such that DC voltage is provided to the motor contactor by the first capacitor during an undervoltage in the power.

In a third aspect, a method is provided for powering an electric motor during undervoltage. The undervoltage in power supply to the electric motor is sensed. DC voltage is supplied to a motor contactor control circuit from a power storage device switched in by a motor protective relay. The electric motor is operated by the motor contactor control circuit while supplied with the direct current voltage from the power storage device.

Other systems, methods, and/or features of the present embodiments will become apparent to one with skill in the art upon examination of the following FIGS. and detailed description. It is intended that all such additional systems, methods, features, and advantages be included within this description, be within the scope of the invention, and be protected by the accompanying claims. Additional features of the disclosed embodiments are described in, and will be apparent from, the following detailed description and the FIGS.'

BRIEF DESCRIPTION OF THE FIGURES

The components in the FIGS. are not necessarily to scale, emphasis instead being placed upon illustrating the principles of the embodiments. In the FIGS., like reference numerals designate corresponding parts throughout the different views.

FIG. 1 is a block diagram of one embodiment of an electric motor control system for undervoltage ride-through;

DESCRIPTION OF SOME EMBODIMENTS

A motor undervoltage ride-through circuit is controlled by a motor protective relay. The motor protective relay controls an added capacitor as the source of extra voltage during an undervoltage event. The microprocessor-based motor protective relay controls and/or regulates the application of DC voltage to a portion of the motor contactor control circuit that operates on rectified-AC voltage, if applicable. This arrangement also operates for motor control circuit components (e.g. contactors and control relays) rated for AC voltage where those components are replaced with DC-rated components or additional elements such as rectifiers and resistors are added to allow them to operate on DC current. The microprocessor-based motor protective relay's output contacts may be used instead of a contactor auxiliary contact that is typically used for a contactor operating from DC control power to limit the current through the coil after the contactor closes.

The capacitor is added along with or without other small devices, while an existing microprocessor-based motor protective relay may be used for control. The total size of the components added to the motor starter control circuit is less than used for a UPS or other devices for addressing undervoltage. The small size allows undervoltage ride-through functionality to be installed in locations (e.g., housings) where it would be difficult or impossible to apply larger devices. The circuit may be more reliable than existing solutions that require adding additional active electronic components. Existing systems may not work as well as because the existing solutions may be third party systems installed in series with the motor control system. Because these other devices are in series, the devices are not able to detect and react to voltage sag as well as using the integrated motor protective relay. These other devices are larger and expensive.

Figure 1:
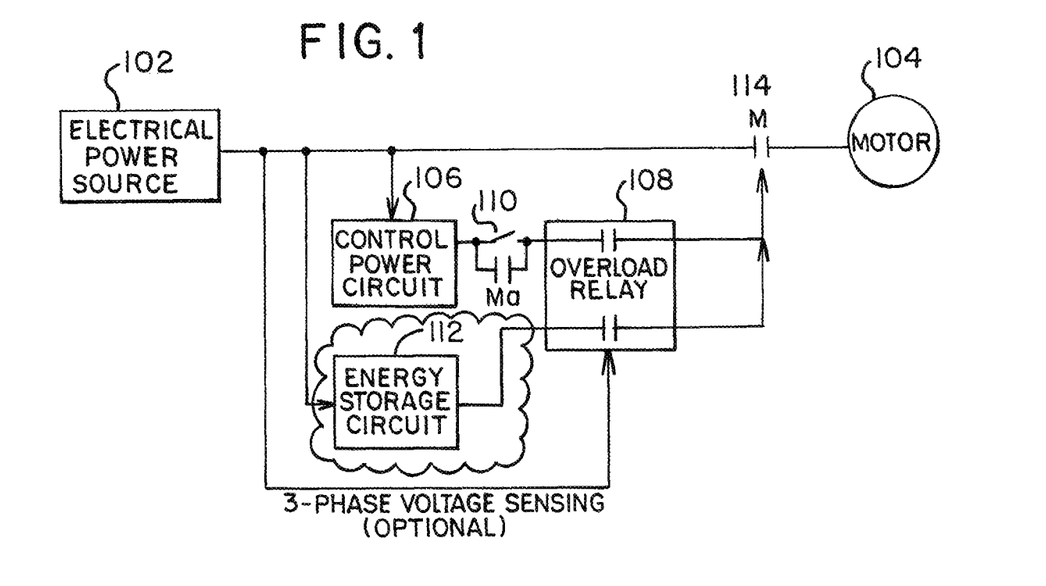

FIG. 1 shows one embodiment of an electric motor control system. A typical control system includes a control power circuit 106, overload relay 108, a start switch 110, and a motor contactor 114. The connections and energy storage circuit 112 are added to any, including a typical, control system. The cloud boundaries in FIG. 1 show the additions to the typical. The existing overload relay 108 is used to control the power output by the energy storage circuit 112 as well as for overload protection.

Additional, different, or fewer components and/or connections may be provided. For example, multiple motors 104 and/or power supplies 102 are provided. As another example, the overload relay 108 performs 3-phase voltage sensing of the power from the electrical power source 102 to detect undervoltage. The undervoltage is a voltage below the minimum to keep the contactor 114 closed for operation of the motor 104. In yet another example, further indicating lights, circuits, or other components are provided, such as connected to the vertical lines extending from the bottom of FIGS. 2 and 3.

The motor 104 is an electric motor. The motor 104 operates on three-phase AC power from the electrical power source 102. The motor contactor 114 is a device that closes to provide the power from the electrical power source 102 to the motor 104. Motor contactor 114 uses power from the control circuit to keep it closed.

Figure 2:
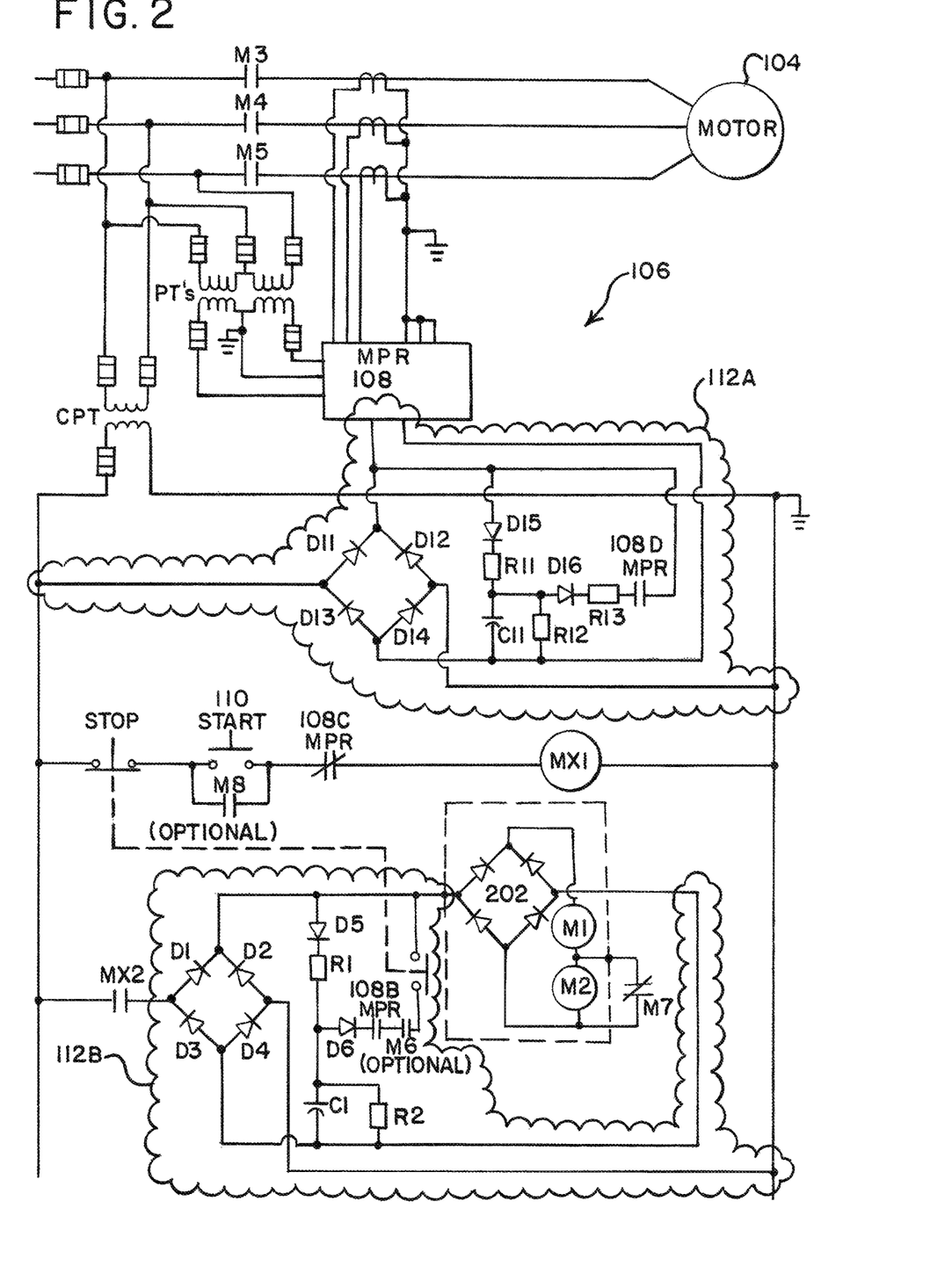
FIG. 2 is a circuit diagram of one embodiment of the electric motor control system of FIG. 1 for use with rectified-AC voltage in a medium voltage or large low voltage arrangement.

In one embodiment, the motor 104 is a medium voltage motor having a contactor that operates on rectified-AC voltage. Medium voltage electric motors are in the range of 2300 to 13200 volts. FIG. 2 is a circuit diagram of the motor control system for use with a medium voltage motor operating on rectified AC voltage. For example, the motor 104 uses a 2300 V or higher voltage motor starters. The clouded portion of the drawing shows the added components for undervoltage operation.

Figure 3:
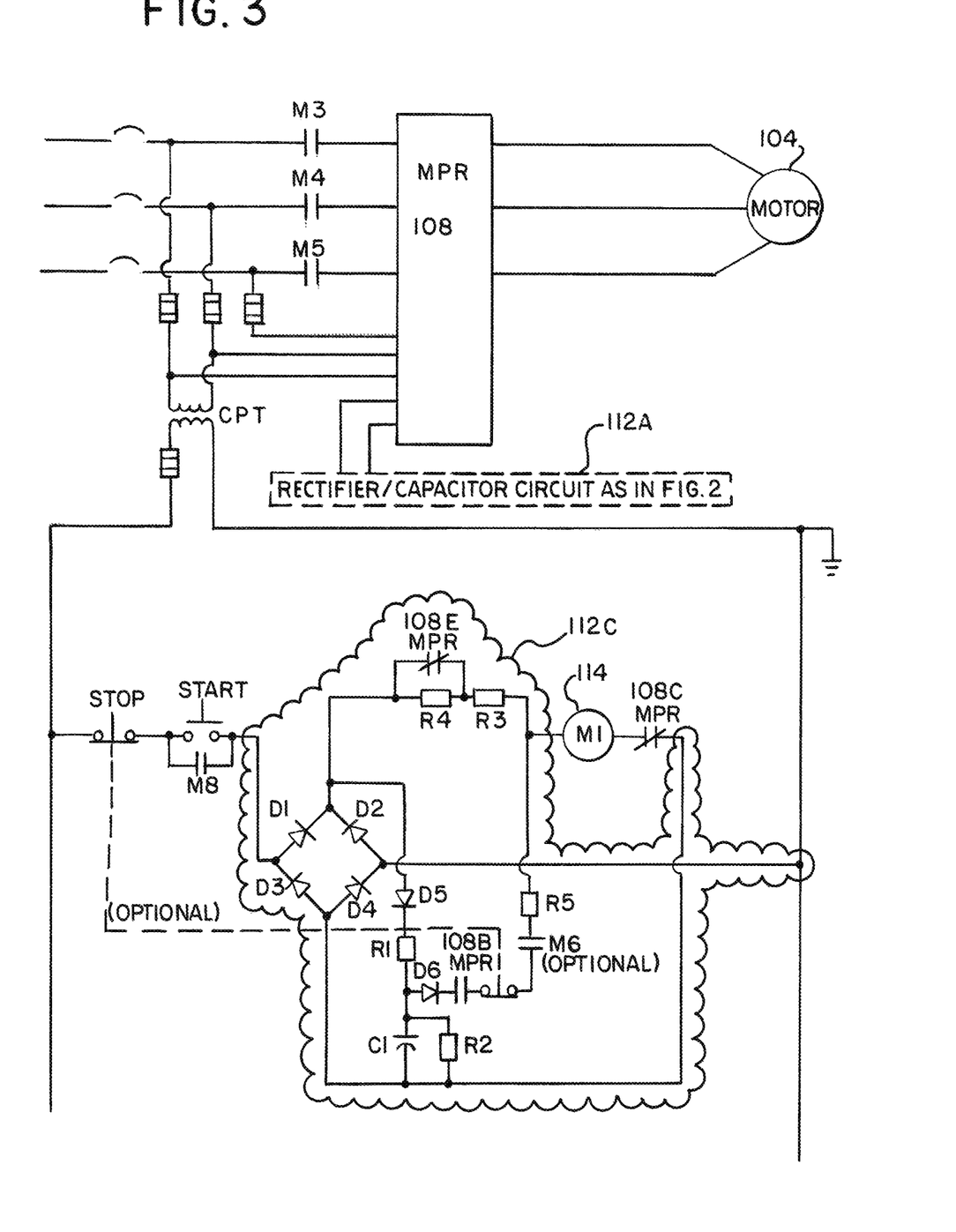
FIG. 3 is a circuit diagram of one embodiment of the electric motor control system of FIG. 1 for use with non-rectified AC voltage in a low voltage arrangement.

In another embodiment, the motor 104 is a low voltage motor having a contactor designed to operate on non-rectified AC voltage. Low voltage electric motors are in the range of 230 to 575 volts. FIG. 3 is a circuit diagram of the motor control system for contactor coils that are designed to operate on AC voltage, rather than rectified-AC voltage. The clouded portion of the drawing shows the added components that allow the contactor to operate on rectified-AC voltage as well as provide undervoltage ride-through functionality.

The control power circuit 106, with or without the energy storage circuit 112, start switch 110, overload relay 108, and/or motor contactor 114, form the circuitry of the electric motor control system. This circuitry is shown in FIGS. 1-3.

The motor contactor 114 is connected to supply power to the motor 104. The contactor 114 is a relay with a contactor coil for opening and closing the relay. Other switches may also be used. The main contacts of the motor contactor 114 apply power to the motor 104. Auxiliary contacts seal in "start" and optionally prevent the undervoltage ride-through circuit (e.g., overload relay 108 and energy storage circuit 112) from closing the contactor 114 after the contactor 114 has opened.

FIGS. 2 and 3 show all three power conductors and components that feed power to the motor 104. M3, M4, and M5 are the individual contacts of contactor 114, which closes when rated voltage is applied to contactor coil M1 and if applicable coil M2. In FIG. 3, the voltage is applied to contactor coil M1 directly through the stop switch, start switch and other components. In FIG. 2, voltage is applied to contactor coils M1 and M2 through contact MX2, which is controlled by interposing relay MX1. FIG. 2 also shows that the stop switch, start switch, etc. are connected in series with the interposing relay MX1.

In FIG. 2, interposing relay coil MX1 is connected in series with a stop switch, the parallel connection of start switch 110 and contactor auxiliary contact M8, and trip contact 108C of the overload relay 108. The contact M8 is a seal-in contact and provided for keeping interposing relay coil MX1 energized when the start switch 110 is released. The overload relay contact 108C is a switch and provided for opening in the event of an overload condition or other problem with the motor. Contact MX2 is a contact that closes when interposing relay coil MX1 is energized and is provided to apply voltage to the contactor coils M1 and M2. In FIG. 3, the motor contactor coil 114 operates without an interposing relay, resulting in contactor coil M1 being connected directly in series with the stop switch, start switch in parallel with contactor auxiliary contact M8 and the overload relay contact 108C.

In FIGS. 2 and 3, it is optional to connect motor contactor auxiliary contact M6 in series with the switched voltage from capacitor C1 to ensure that contactor coil M1 will not be inadvertently energized when contactor M1 is open, when the motor 104 is not running. Likewise, an additional optional STOP contact connected next to contact M6 will also ensure that contactor coil M1 will not be inadvertently energized. In FIG. 2, the motor contactor auxiliary contact M7 is closed when contactor coil M1 is first energized, thereby allowing full voltage to be applied to coil M1. Contact M7 opens when the contactor closes and causes contactor coils M1 and M2 to be connected in series, which causes less current to flow through coil M1 and reduces the amount of current and dissipated power in that portion of the control circuit.

If potential transformers (PTs) are provided in the motor circuit, the PTs may be wired as shown in FIG. 2 to allow the motor protective relay 108 to accurately measure the severity of the voltage sag event on each of the three phase voltages. The PTs reduce the motor voltage down to a level that can be measured by the motor protective relay 108. In alternative embodiments, the PTs are not provided, in which case the motor protective relay 108 may be wired to measure the voltage on the control power transformer (CPT) circuit. If the motor protective relay 108 is connected to measure only the single phase CPT voltage, the voltage measurements made by the motor protective relay 108 may be less accurate in determining the motor 104 voltage than those made with PTs, but will still be an accurate reflection of the voltage on the control power circuit 106, and specifically contactor coils M1 and (if applicable) M2. The motor protective relay 108 measures the current in each phase to the motor 104 directly as shown in FIG. 3 (e.g., direct connect to one or more, such as all three, phase lines) or by using current transformers (CTs) as shown in FIG. 2.

In the circuit designed to operate on non-rectified AC (see FIG. 3) and in the circuit operating on rectified AC (see FIG. 2), a single-phase control power transformer CPT is connected from the electrical power source 102 to the control power circuit 106 to supply AC voltage to the various control components for the motor 104.

The energy storage circuit 112 includes one or more energy storage devices. In the examples of FIGS. 2 and 3, the capacitor C1 is provided as the energy storage device. This energy-storage capacitor C1 is of any size, such as 2k-5k microfarads. Instead of using the capacitor C1 to store the energy needed to keep the motor contactor closed, a battery may be used.

When the motor protective relay 108 detects an undervoltage condition, the motor protective relay 108 closes the contact 108B, which allows the energy stored on capacitor C1 to flow to contactor coil M1 and (if applicable) coil M2. This keeps contactor 114 contacts M3, M4 and M5 closed, thereby keeping motor 104 connected to the power system. When not connected, the capacitor C1 charges, storing energy. The capacitor C1 may function (i.e., provide power) for a short time even when the AC control power voltage is zero. When used with a three-phase power supply (not shown), the capacitor C1 may function for an extended time when the control circuit voltage is low (even zero volts) if at least one of the other two voltages remains high (e.g. at least 70% of rated voltage).

In addition to contactor coil M1 and (if applicable) coil M2, the motor protective relay 108 may use a source of power during an undervoltage event. Another capacitor C11 (see FIG. 2) is provided for this purpose. Relay 108D of the motor protective relay 108 is used to switch the capacitor C11 voltage to provide power to the control power input of the motor protective relay 108, in parallel with the normal source of voltage from the control power circuit. The capacitor C11 stores energy under normal conditions and provides that energy to the motor protective relay 108 during undervoltage conditions.

The capacitor C11 may be 1 k-2k microfarads, but other size capacitors may be used.

The energy storage circuit 112 also includes bridge rectifiers connected to convert AC voltage to quasi-DC voltage to charge capacitors C1 and C11. The diodes D1, D2, D3, D4, D11, D12, D13 and D14 form the bridge rectifiers. The motor contactor coils M1 (and if applicable) M2 operate on the quasi-DC voltage or the DC voltage from the capacitor C1. Similarly, the motor protective relay 108 operates on the quasi-DC voltage or the DC voltage from the capacitor C11.

The energy storage circuit 112 may also include other diodes. For example, rectifier diodes D5, D15 connect in series with the capacitors C1, C11, respectively, such that the capacitors C1, C11 store DC voltage. The rectifier diodes D5, D15 are connected to prevent the capacitor energy from discharging back into other parts of the circuit 106.

Other rectifier diodes D6, D16 prevent capacitors C1, C11, respectively, from being charged in an uncontrolled manner under certain conditions. Additional, different, or fewer diodes may be provided. Other connections may be used.

The energy storage circuit 112 also includes one or more resistors. In the examples of FIGS. 2 and 3, resistors R1, R11 connect in series between the rectifier diodes D5, D15 and the capacitors C1, C11, respectively, to limit the amount of DC current that flows into the capacitors C1 and C11 while the capacitors C1, C11 are being charged to avoid overload on the AC control power circuit 106.

Resistors R2, R12 slowly discharge the energy in the capacitors C1, C11, respectively, when the AC control power circuit 106 is turned off, so that the capacitors C1, C11 are not a shock hazard to personnel who might work on the circuit. Resistor R13 (see FIG. 2) is used in the energy storage circuit 112 that feeds the power supply of the motor protective relay 108. The resistor R13 connects in series with the relay 108D to limit the amount of current that initially flows out of capacitor C11 to the capacitor in power supply of the motor protective relay 108 so that the rating of motor protective relay's 108 output contact 108D is not exceeded.

Additional, different, or fewer resistors may be used. Resistors may be connected at other locations. FIG. 3 shows additional resistors R3, R4, R5 for a contactor coil that was originally designed to function with AC voltage rather the quasi-DC voltage from the circuit shown. These additional resistors R3, R4, R5 limit the DC current that flows through the contactor coil of the motor contactor 114 since such a coil typically has a very low resistance and therefore would draw excessive current and overheat. The resistor R3 limits the contactor coil current immediately after the start button is pushed, but before the contactor closes. The resistor R4 is initially bypassed when the start button is pushed, so that the contactor coil receives enough current to allow the contactor 114 to close. After the contactor 114 closes, the motor protective relay contact 108E (or a contactor "b" contact if available) is opened, which places resistor R4 in series with R3 to limit the contactor coil current to a much lower value. The resistor R5 limits the contactor coil current during a voltage sag, when motor protective relay closes its output contact 1086 to apply DC voltage to the contactor coil.

Other arrangements may be used for the energy storage circuit 112. Different connections and/or components may be used with an energy storage device (e.g., capacitors C1, C11). Additional, different, or fewer separate energy storage circuits 112A, 112б, 112C may be used depending on the circuit arrangement of the control power circuit 106. Small, discrete components, including the energy storage (e.g., capacitors C1, C11) are added within a same housing or in a separate housing as for the control power circuit 106.

The active switching to supply energy from the energy storage circuit 112 is provided by the already existing or added motor protective relay 108. For example, a microprocessor-based motor protective relay 108 provided for overload protection is also used for undervoltage control. The microprocessor-based motor protective relay 108 includes the relay 108C for removing power in an overload condition and additional relays 108B, 108D, 108E to be controlled for undervoltage condition. In another example, an existing control power circuit 106 is retrofitted to replace a motor protective relay 108 with a microprocessor-based motor protective relay 108.

The overload motor protective relay 108 is a microprocessor-based motor protective relay configured for overload protection. As shown in FIGS. 2 and 3, the overload relay 108 includes one or more relays 108B-D. One or more relays, such as relay 108C, are normally closed and typically open only when an overload condition is detected. In FIG. 2, the motor protective relay 108 opens the relay 108C to remove power from the auxiliary relay MX1, which in turn opens relay MX2 and removes power to motor contactor coils M1 and M2, causing motor contacts 114 to open so that the motor 104 ceases operation. In FIG. 3, the motor protective relay 108 opens the relay 108C to interrupt power directly from the motor contactor coil M1, causing motor contacts 114 to open so that the motor 104 ceases operation.

The overload relay 108 is used by motor control systems to protect the motor 104 from overheating if the motor becomes overloaded. The overload relay 108 may perform other functions such as detecting a partial failure in the motor 104, detecting a loss of the load the motor 104 is powering, tripping for a short circuit in the motor 104, etc. The overload relay 108 is also used for purpose of controlling the switching of energy in the capacitor C11 or battery to keep the contactor M1, M2 closed during a voltage sag. The overload relay 108, due to the ability to sense voltage or current and apply logic to response performs multiple functions (e.g., dual or multi-purpose device).

The number and size of added components for undervoltage ride-through capability is minimized by utilizing the existing microprocessor-based motor protective relay 108, if already installed, or added to replace an existing older-technology relay. The microprocessor-based motor protective relay 108 performs the control logic and switching of the energy-storage device (e.g., capacitor C1, C11) of the energy storage circuit 112. By not adding another power supply or other active electronic components in the motor control circuit 106, undervoltage protection may be provided in a more reliable manner than other undervoltage solutions as circuits with more components and/or electronic switching components in series with the contactor coil or interposing relay tend to be less reliable.

The power input of the motor protective relay 108 is rated for either AC (e.g., FIG. 3) or DC and/or rectified AC (e.g., FIG. 2) control power. Alternatively, the motor protective relay 108 or its power supply is replaced with one that can operate on DC and/or rectified AC power.

The microprocessor-based motor protective overload relay 108 has programmable functions. User or programmer-customizable logic functions are implemented. The sensing of voltage sag and/or response may be reprogrammed for customized function due to the relay 108's programmable functions. General purpose logic and math processing functions are provided so that the undervoltage ride-through performance can be adjusted to be a function of various voltage quantities (e.g. minimum voltage, average voltage, positive sequence and/or negative sequence voltage), current quantities, power, reactive power, time, status of an input contact, etc. For example, the AC voltage on a transformer PT or CPT, on the electrical power source 102, or as provided to the motor 104 is measured. One or more inputs on the microprocessor-based motor protective overload relay 108 receive input signals for the measurement of the voltage. In the example of FIG. 2, transformers PT output a voltage as a measurement input to the overload relay 108. In the example of FIG. 3, the overload relay 108 receives signals from the transformer CPT or lines from the power source 102 as measures of single-phase control power voltage and measures of 3-phase current to estimate any voltage sag. The measurements as input signals to the overload relay 108 are used by the overload relay 108 microprocessor to detect any voltage sag. The AC voltage is measured on the transformers PT and/or CPT to determine if the voltage is below the minimum operation voltage for the motor contactor coils M1 and (if applicable) M2 (i.e., if an undervoltage is occurring on any of the phase lines).

The microprocessor-based overload relay 108 may include logic to generate and save an event report that lists the voltages and control device actions for the duration of each voltage sag, allowing the user to evaluate performance and make adjustments as necessary. The event report may list the motor currents, voltages, contact input status, contact output status, and other similar information.

The motor protective relay 108 is configured by programming to switch in the capacitor C1 to apply voltage to the motor contactor coils M1 and (if applicable) M2 in response to the detection of the voltage sag. For example, the relay contact 108B is closed to provide power from the capacitor C1 to the motor contactor coils M1 and (if applicable) M2. In one embodiment, the overload relay 108B operates with a sequence of open and close switching to provide the power, such as with pulse width modulation to control the amount of power supplied by the capacitor C1. The capacitor C1 supplies DC voltage in response to sensing the undervoltage, which DC voltage may be pulse width modulated or provided without modulation.

The power from the capacitor C1 is switched in by the overload relay contact 108B as controlled by the motor protective overload relay 108 such that the motor contactor 114 remains closed and the motor 104 operational during the sag. The amount of power through pulse width modulation or other voltage control may be based on the minimum needed by contactor coils M1 and (if applicable) M2 to allow contactor 114 to stay closed. For example, the microprocessor-based overload relay 108 calculates the additional average voltage needed by the contactor coil M1 and (if applicable) M2, and then closes output contacts controlling the relay 108B in a sequence to deliver the appropriate average voltage from the capacitor C1. The contactor 114 with AC coil M1 may be kept closed even if the voltage drops to 0 V while still allowing the user to trip the contactor open during the voltage sag, which is unlike existing devices typically applied on 480 V motor control circuits. No switching of the AC portion of the motor control power circuit 106 (e.g. opening a normal power solid state switch and closing a different solid-state switch fed from an inverter when there is a voltage sag, and then switching back when the voltage recovers) is not needed.

The motor protective relay 108 is configured by programming to switch in the capacitor C11 to apply voltage to the relay 108's power supply input circuit in response to the detection of the voltage sag. For example, the overload relay 108 calculates the additional average voltage needed for the protective relay's power supply, and then closes its output contacts in a sequence that will deliver the appropriate average voltage from capacitor C11 to the power inputs of the motor protective relay 108, and/or other control circuitry.

The same or different pulse width modulation by the relay 108D may be used for the power from capacitor C11 as for the relay 108B. Alternatively, a constant or non-modulated power is output to power or make up for a difference in power due to the voltage sag. The output power may vary over time based on the sensed magnitude of the voltage sag.

Other control functions or programming may be used for switching the capacitors C1, C11 to provide power or make up for power reduction during undervoltage. Since the overload relay 108 is programmable, various triggers, reaction, and/or switching may be used to supply power to make up for reduction in power due to the voltage sag.

In one embodiment, the capacitors C1, C11 continue to provide power until the capacitors C1, C11 are drained or until the undervoltage condition ends. In other embodiments, the overload relay 108 may open the relays 108B, 108D for the capacitors C1, C11 to protect other components in the electrical system. For example, the capacitor C1 is switched out to not provide power during the undervoltage to reduce the chance that high motor currents associated with the voltage sag will trip upstream circuit breakers, which would typically cause a much longer interruption of the facility's processes.

In one embodiment, the overload relay 108 is programmed to determine the torque of the motor 104 and switch out the capacitor C1 based on the torque. Other information, such as time (e.g., length of sag), current, voltage, and/or amount of sag may be used with or instead of the torque to determine whether to cease undervoltage ride through. One or more measures are compared to one or more thresholds or used in a function to determine whether to continue undervoltage ride through (i.e., to continue providing power by the capacitors C1 and/or C11).

In one embodiment, if 3-phase transformer PT voltage is available, the overload relay 108 calculates the torque that the motor 104 can develop during the voltage sag, so the overload relay 108 calculates how long the motor 108 can be kept on-line without slowing down to the point where the motor 104 would not be able to reaccelerate even if the system voltage recovered partially. Motors, especially a group of them, can create a significant voltage drop in the system if their speeds drop slightly below rated speed because they consume a significant amount of reactive current at such speeds. The reactive current may cause a large voltage drop even if the utility voltage is near its normal value. If the voltage drop is large enough, the motors 104 will not be able to produce enough torque to reaccelerate. This may be avoided by ceasing undervoltage ride through for some of the motors.

In another embodiment, if 3-phase transformer PT voltage is not available, the overload relay 108 may measure the single-phase voltage (see FIG. 3). The microprocessor 108 uses that voltage and the motor 3-phase current to estimate the severity of the voltage sag. The severity of the voltage sag in time, amplitude, and/or number of phases indicates how long the motor 104 can be kept on line without slowing down to the point where the motor 104 would not be able to reaccelerate even if the system voltage recovered partially (e.g., indicates the torque). The overload relay 108 determines how long to keep the motor contactor 114 closed.

Figure 4:
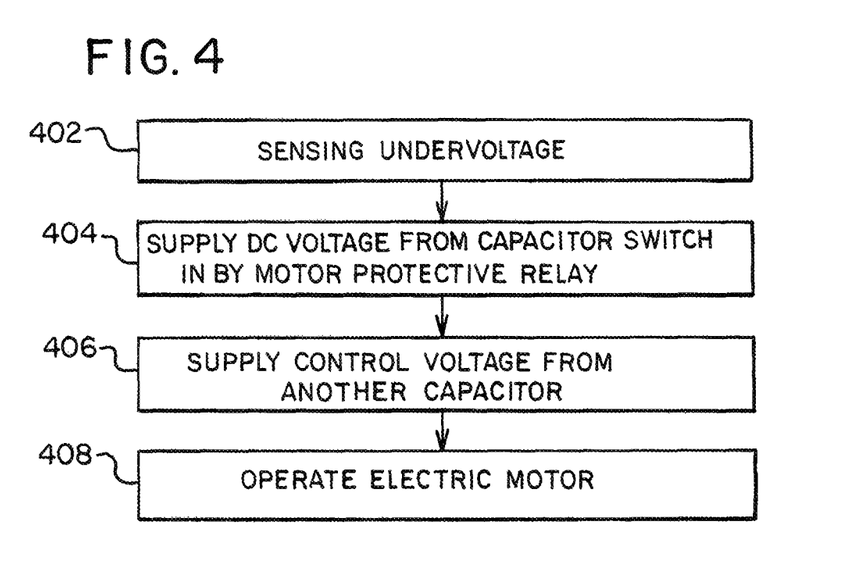
FIG. 4 is a flow chart diagram of one embodiment of a method for powering an electric motor during undervoltage.

FIG. 4 shows one embodiment of a method for powering an electric motor 104 during undervoltage. Upon detecting an undervoltage, a capacitance or other power storage device is switched on to keep the motor contactor 114 for the motor 104 closed. DC power is provided by the power storage device. To avoid having to add extra switching and switching control, a microprocessor-based motor protective relay 108 may be used to switch for undervoltage.

The method is implemented by the system of FIG. 1, the circuit of FIG. 2, the circuit of FIG. 3, or other circuit. For example, a motor protective relay 108 senses undervoltage and causes a capacitor C1 or capacitors C1, C11 to supply DC and/or control voltages. This additional voltage keeps the motor contactor 114 closed, which allows the motor 104 to continue to operate.

The method is performed in the order shown (i.e., top-to-bottom or numerical) or other order. For example, act 406 is performed before or at a same time as act 404. Additional, different, or fewer acts may be provided. For example, act 406 is not performed. As another example, acts for setting thresholds or programming for undervoltage ride-through are performed.

In act 402, the motor protective relay 108 senses the undervoltage in power supply to the electric motor 104. The voltage, current, and/or motor operation are sensed. For example, the voltage from a transformer PT and/or voltage from a phase of the electrical power source 102 and current from the electrical power source 102 are sensed as signal level at input terminals of the motor protective relay 108.

The voltage, current, and/or motor operation are compared to a threshold or group of thresholds. Alternatively, information is combined, and the combination is compared to a threshold. Where the voltage to the motor 104 falls below a minimum or minimum plus a programmable margin to keep a motor contactor 114 closed, undervoltage is sensed. Where the motor contactor 114 has enough voltage to remain closed, allowing operation of the motor 104, undervoltage is not occurring.

In act 404, a power storage device 112 supplies DC voltage to the motor contactor control circuit. For example, the capacitor C1 or battery provide power. The motor protective relay 108 operates a relay 1086 of the motor protective relay 108 to switch in the power storage device of the power storage circuit 112. In response to sensing the undervoltage, the power storage device switches in to provide power to the motor contactor coils M1 and (if applicable) M2 to keep motor contactor 114 closed for continued operation of the motor 104 as a ride through of the undervoltage.

The DC voltage is provided as a fairly constant voltage over the course of each power system cycle but will slowly decrease in magnitude with each successive power system cycle when providing power to contactor coils M1 and (if applicable) M2. The motor protective relay 1086 may pulse width modulate the DC voltage to provide the minimum or minimum plus the margin to keep the motor contactor 114 closed. The pulse width modulation provides an average DC voltage that is a threshold amount above a minimum rated voltage of the motor contactor control circuit. A duty cycle, such that the average and/or RMS output voltage, only slightly higher than the minimum rated voltage of the contactor coil or other control circuit components is used.

In one embodiment, the microprocessor-based motor protective relay 108 used for overload protection is programmed with an additional or new algorithm to control the effective magnitude of the output voltage supplied to the contactor coil M1 and (if applicable) M2 of the motor contactor 114 and/or other control circuit devices of the control power circuit 106 in order to reduce the amount of energy required from the energy storage capacitor C1, C11. Other algorithms may be used to optimize the duration of the output voltage to the contactor coil in order to keep the motor 104 on line as long as possible without causing protective devices to trip.

A duty-cycle operation may be used to provide the voltage at the desired magnitude. In other embodiments, the voltage magnitude algorithm provides more than standard duty-cycle operation. The microprocessor 108 may control the motor protective relay 1086 to provide the output voltage in ¼-cycle (0.004167 second for a 60 Hz system) increments or other increments as limited by the switching capabilities of the protective relay's output contacts. The pulse width modulation may account for other considerations using this incremental control. For example, the pulse width modulation is controlled to avoid positive and negative asymmetry greater than 1%, 5%, 10%, 20% or 30% in an AC portion of a motor power control circuit 106. The output voltage pulses are controlled to minimize the flow of asymmetrical current in the AC portion of the control circuit 106. Asymmetrical current may cause control transformers CPT to saturate and cause the control transformer primary fuses to melt. To minimize the flow of asymmetrical current in the AC portion of the control circuit 106, the duration of output voltage pulses is identical for each pair of pulses, and the starting time of each pair of pulses is equal to a multiple of a power system cycle (0.0167 second for a 60 Hz system). Other approaches may be used.

The microprocessor-based motor protective relay 108 may be programmed to cease or not supply the voltage from the power storage device even during undervoltage. Based on an amount, time, and/or number of phases suffering undervoltage, the supply may be ceased to avoid longer term shut down or harm to other devices. For example, the supply continues until or if a torque of the electric motor is below a threshold.

In act 406, the same or a different power storage device of the energy storage circuit 112 supplies control voltage to the power control circuit 106 and/or the motor protective relay 108. For example, another capacitor C11 supplies power to the microprocessor-based motor protective relay 108 during the undervoltage. The motor protective relay 108 closes the relay 108D to supply power from the capacitor C11 or other power storage device to the power input circuit for motor protective relay 108 or other control component of the control power circuit 106.

The power is added to or replaces any still available power to operate the motor protective relay 108, providing for ride-through of the undervoltage by the motor protective relay 108 or other control components. Act 404 may be performed without act 406 or vise versa depending on the voltage needed to operate the motor protective relay 108 as compared to the voltage needed to operate coil M1 and (if applicable) M2 of motor contactor 114 in view of the amount of voltage sag.

In act 408, the electric motor 104 operates. The motor contactor control circuit 106 is provided power from the energy storage circuit 112 to energize the contactor coils M1 and (if applicable) M2 of the motor contactor 114. The DC voltage supplied by the energy storage circuit 112 (e.g., capacitor C1) alone or in addition to voltage provided by the electrical power source 102 during the sag keeps the motor contactor 114 closed.

The continued operation of the motor 104 despite the undervoltage from the electrical power source 102 may avoid stoppage of the motor 104. Keeping the motor 104 operational during undervoltage or for a longer time after the start of undervoltage may avoid ceasing of important operations, such as manufacturing, pumping, or transporting operations. Increased operation time or decreased down time increases efficiency, reduces costs, and/or avoids inconvenience.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A motor control system for a medium or low voltage motor, the motor control system comprising:
    a motor contactor connected to supply power to the motor;
    a microprocessor-based motor protective relay configured for overload protection; and
    a first capacitor connectable with the motor contactor,
    wherein the microprocessor-based motor protective relay is configured to detect a voltage sag of power to the motor from a voltage measurement at a control power transformer, potential transformer or a direct connection to a motor phase line and to switch in the first capacitor to apply voltage to the motor contactor in response to the detection of the voltage sag.

2. The motor control system of claim 1, wherein the motor operates on rectified alternating current voltage.

3. The motor control system of claim 1, wherein the motor operates on non-rectified alternating current, and further comprising one or more resistors connected to limit direct current flowing through a contactor coil of the motor contactor.

4. The motor control system of claim 1, wherein the motor contactor comprises a contactor coil and an interposing relay configured to apply voltage to a contactor coil.

5. The motor control system of claim 1, wherein the microprocessor-based motor protective relay is configured to switch in the first capacitor with pulse width modulation of voltage from the first capacitor.

6. The motor control system of claim 1, further comprising three-phase potential transformers or connection to all three phases of the motor circuit, wherein the microprocessor-based motor protective relay is configured to determine a torque of the motor and switch out the first capacitor based on the torque.

7. The motor control system of claim 1, further comprising a bridge rectifier connected in parallel with the first capacitor.

8. The motor control system of claim 1, further comprising a rectifier diode connected in series with the first capacitor such that the first capacitor stores direct current voltage.

9. The motor control system of claim 1, further comprising a second capacitor connected in series with a contact to the power input of the microprocessor-based motor protective relay, wherein the microprocessor-based motor protective relay is configured to switch in the second capacitor to apply voltage to the microprocessor-based motor protective relay in response to the detection of the voltage sag.

10. The motor control system of claim 1, wherein the microprocessor-based motor protective relay is configured to switch in the first capacitor such that the motor contactor remains closed and the motor operational during the sag.

11. An electric motor control system comprising:
    an electric motor connected to receive power;
    a motor control power circuit having a motor contactor connected to supply power to the electric motor and having a first capacitor connected with the motor contactor such that direct current voltage is provided to the motor contactor by the first capacitor during an undervoltage in the power; and
    a microprocessor-based motor protective relay having a microprocessor and relay contacts, the microprocessor configured to sense the undervoltage and switch the first capacitor to supply the direct current voltage in response to sensing the undervoltage.

12. The electronic motor control system of claim 11, wherein the microprocessor-based motor protective relay is configured for overload protection and to switch out the first capacitor during the undervoltage.

13. The electronic motor control system of claim 11, wherein the motor control power circuit further comprises a second capacitor connected to provide power for operation of the microprocessor-based motor protective relay during the undervoltage.

14. A method for powering an electric motor during undervoltage, the method comprising:
    sensing the undervoltage in power supply to the electric motor;
    supplying direct current voltage to a motor contactor control circuit from a power storage device switched in by a motor protective relay until a torque of the electric motor is below a threshold; and
    operating the electric motor by the motor contactor control circuit while supplied with the direct current voltage from the power storage device.

15. The method of claim 14, wherein the motor protective relay comprises a microprocessor-based motor protective relay, and wherein the sensing is by a microprocessor of the microprocessor-based motor protective relay.

16. The method of claim 15, further comprising supplying control voltage from another power storage device to the microprocessor during the undervoltage.

17. The method of claim 14, wherein supplying comprises pulse width modulating the direct current voltage modulated to be a threshold amount above a minimum rated voltage of the motor contactor control circuit and to avoid positive and negative asymmetry in an alternating current portion of a motor power control circuit greater than 10%.

* * * * *